(No Model.) 6 Sheets—Sheet 3.

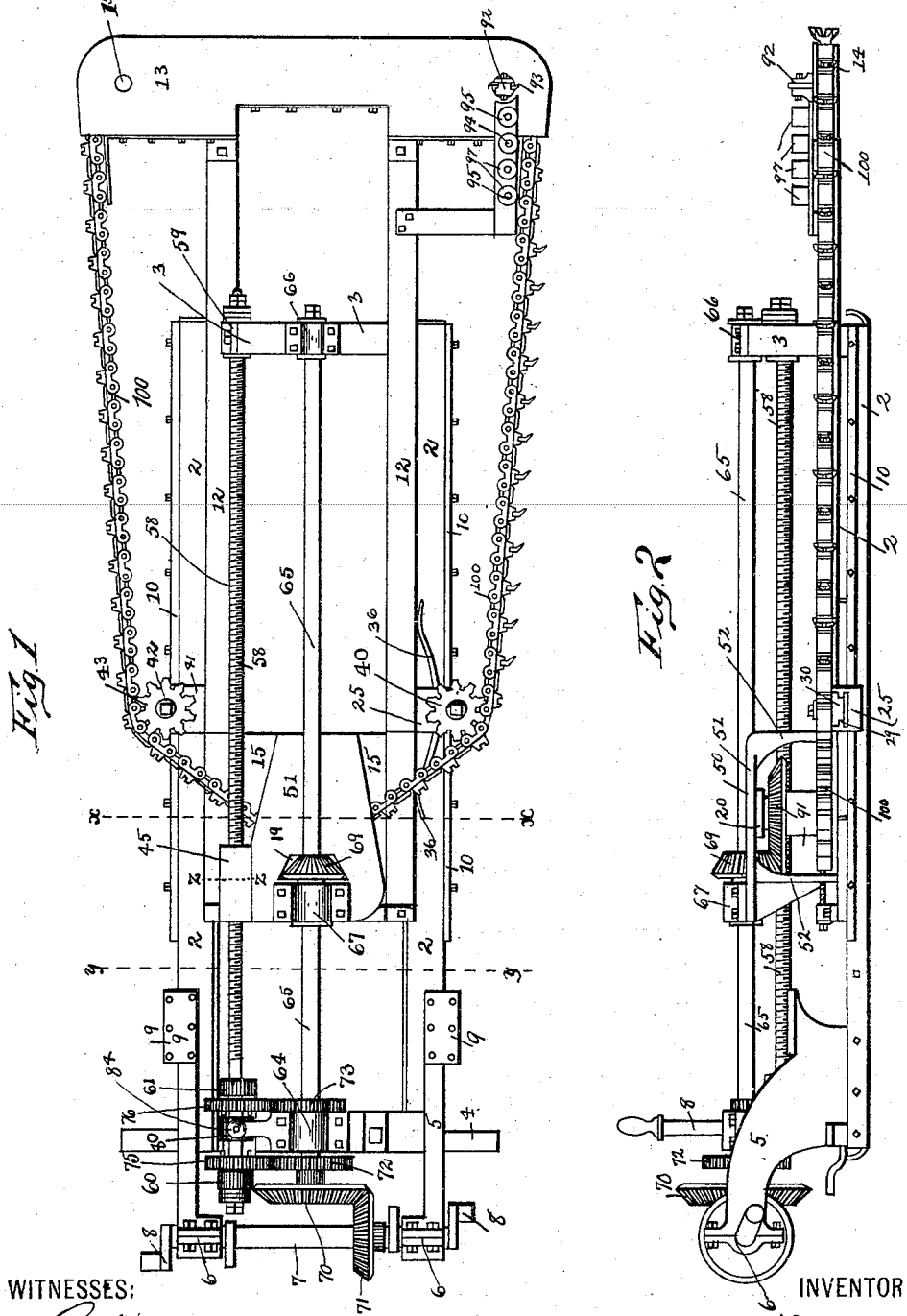

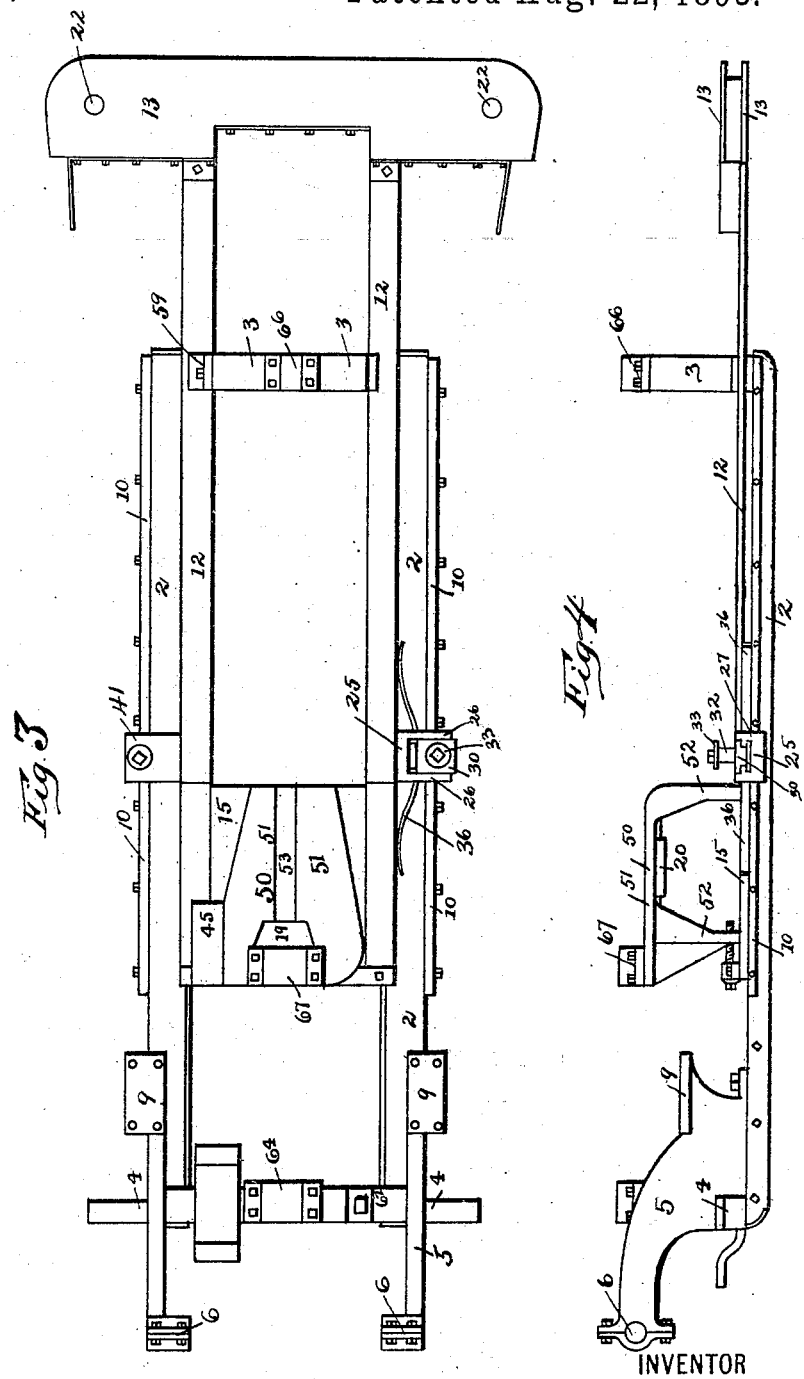

F. M. LECHNER.
MINING MACHINE.

No. 503,607. Patented Aug. 22, 1893.

WITNESSES:
C. B. Bradshaw
A. L. Phelps

INVENTOR
Francis M. Lechner
BY
Staley and Shepherd
ATTORNEYS.

(No Model.) 6 Sheets—Sheet 4.

F. M. LECHNER.
MINING MACHINE.

No. 503,607. Patented Aug. 22, 1893.

WITNESSES:
H. B. Bradshaw
A. L. Phelps

INVENTOR
Francis M. Lechner
BY
Staley and Shepherd
ATTORNEYS.

(No Model.) 6 Sheets—Sheet 5.

F. M. LECHNER.
MINING MACHINE.

No. 503,607. Patented Aug. 22, 1893.

WITNESSES:
H. B. Bradshaw
A. L. Phelps

INVENTOR
Francis M. Lechner

BY
Staley and Shepherd
ATTORNEYS.

(No Model.)
F. M. LECHNER.
MINING MACHINE.
No. 503,607. Patented Aug. 22, 1893.
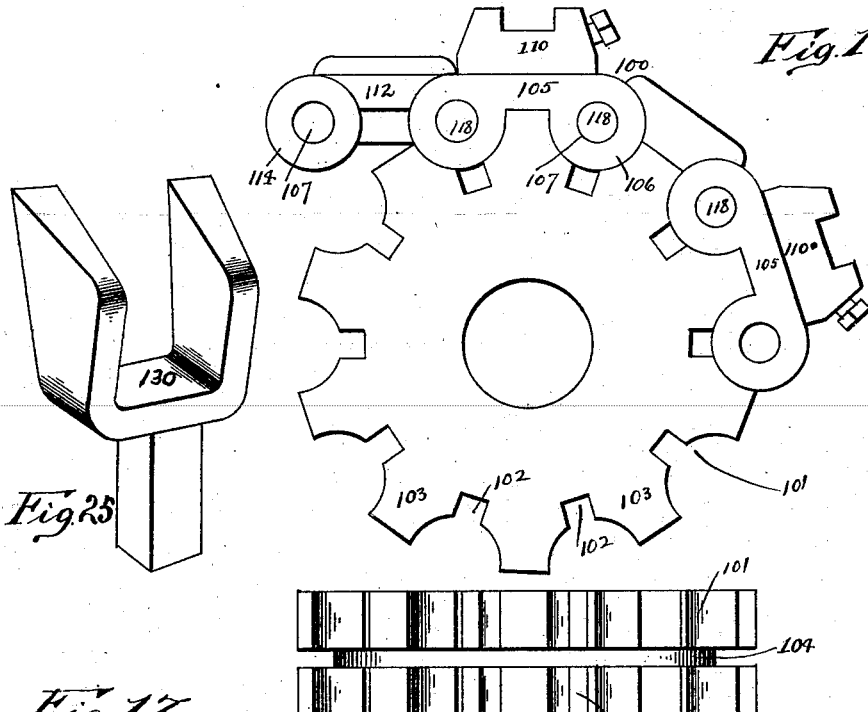
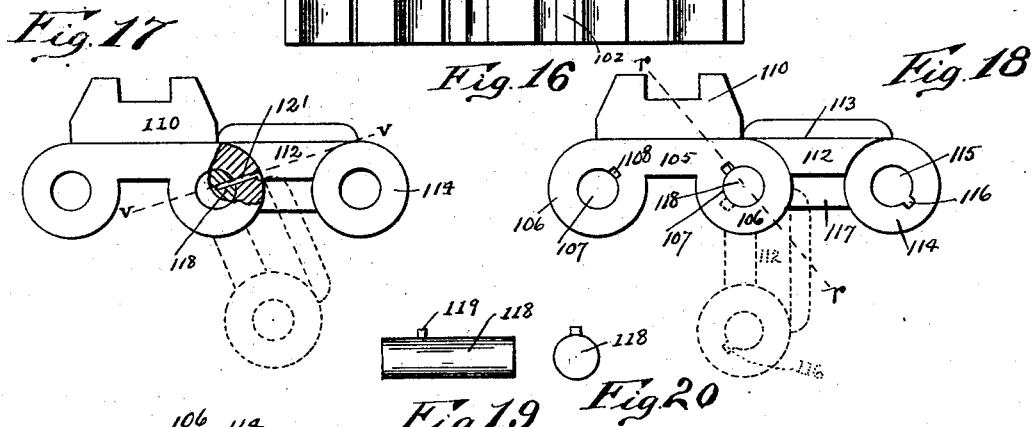
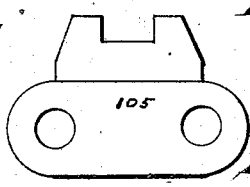
WITNESSES:
J. C. B. Bradshaw
A. L. Phelps
INVENTOR
Francis M. Lechner.
BY Staley and Shepherd
ATTORNEYS.

UNITED STATES PATENT OFFICE.

FRANCIS M. LECHNER, OF COLUMBUS, OHIO.

MINING-MACHINE.

SPECIFICATION forming part of Letters Patent No. 503,607, dated August 22, 1893.

Application filed March 3, 1893. Serial No. 464,571. (No model.)

*To all whom it may concern:*

Be it known that I, FRANCIS M. LECHNER, a citizen of the United States, residing at Columbus, in the county of Franklin and State of Ohio, have invented a certain new and useful Improvement in Mining - Machines, of which the following is a specification.

My invention relates to the improvement of mining machines of that class wherein a stationary frame is employed in conjunction with a sliding frame thereon, the latter carrying a moving cutting chain.

The objects of my invention are to provide a mining machine of superior construction and arrangement of parts which will greatly facilitate the mining of coal and other minerals and to produce other improvements which will be more specifically pointed out hereinafter. These objects I accomplish in the manner illustrated in the accompanying drawings, in which—

Figure 5:
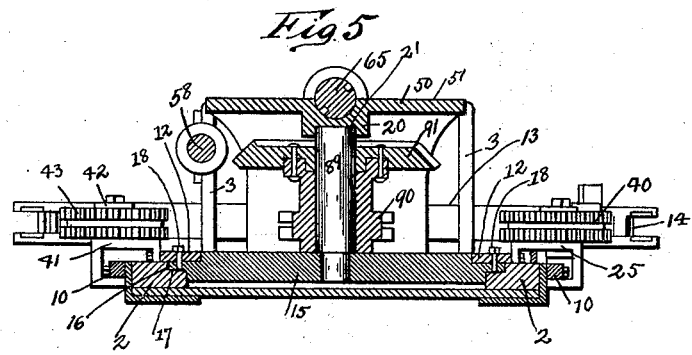
Figure 6:
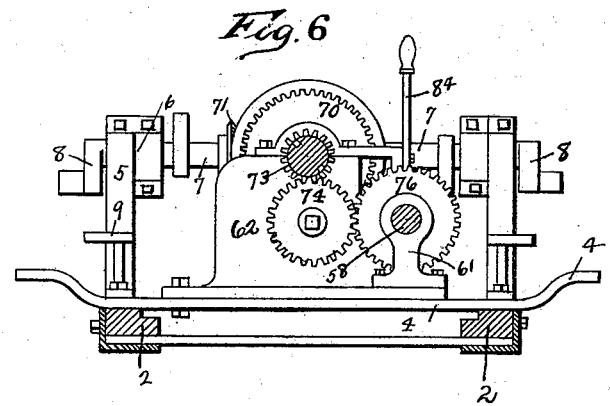
Figure 7:
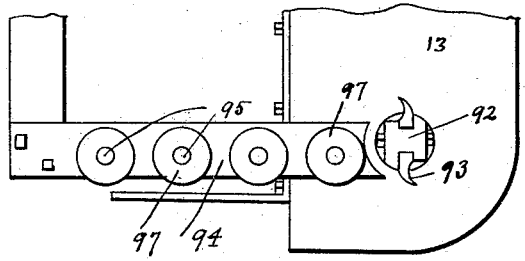
Figure 8:
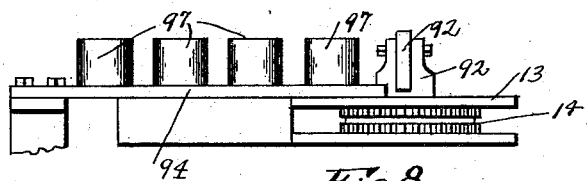
Figure 9:
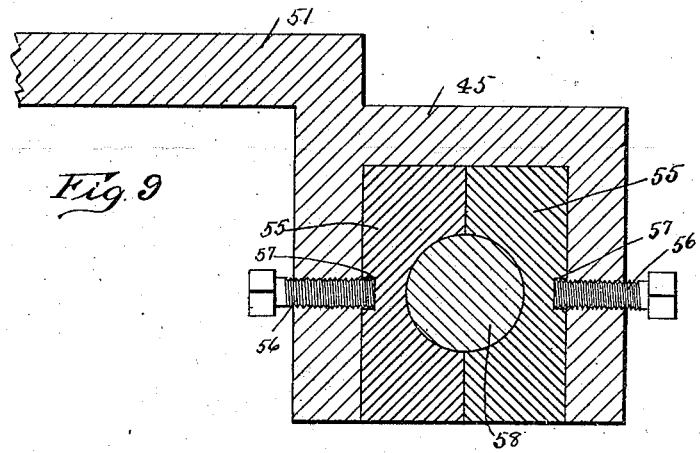
Figure 10:
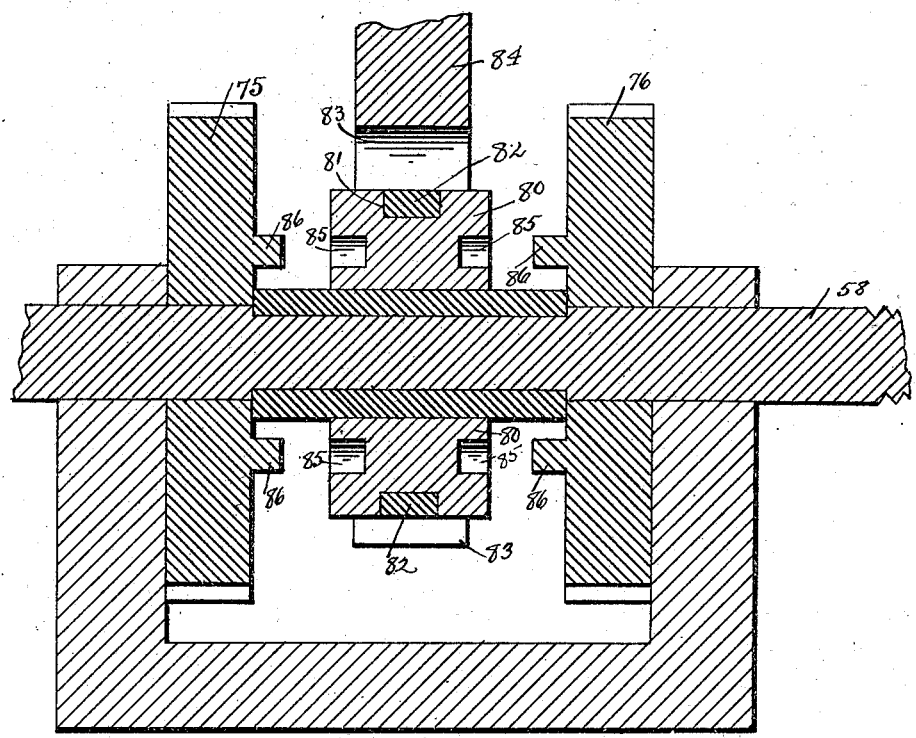
Figure 11:
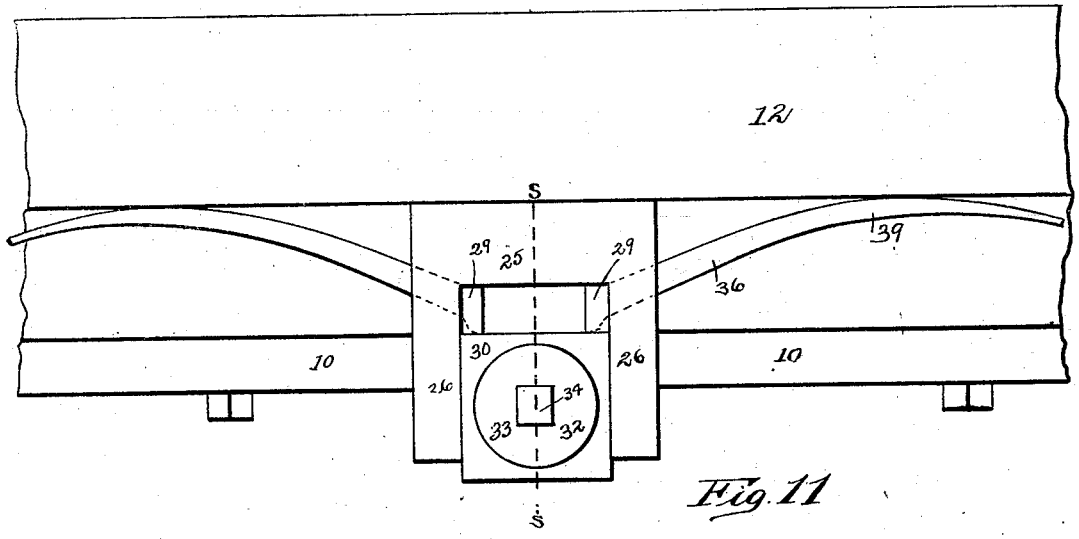
Figure 12:
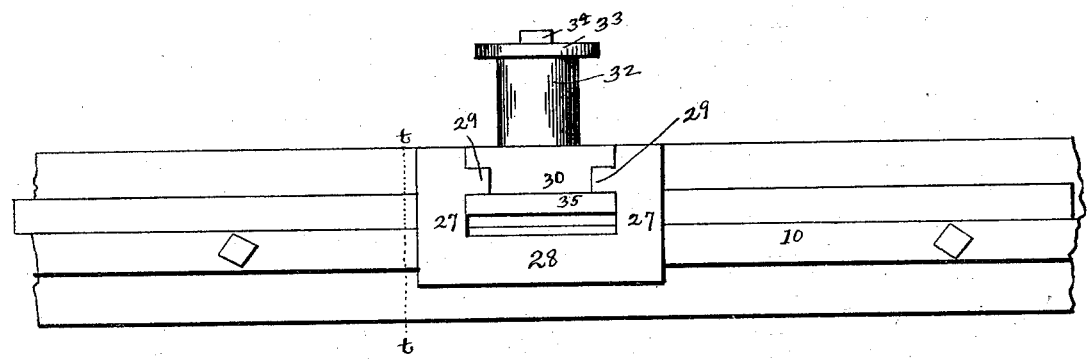
Figures 13, 14:
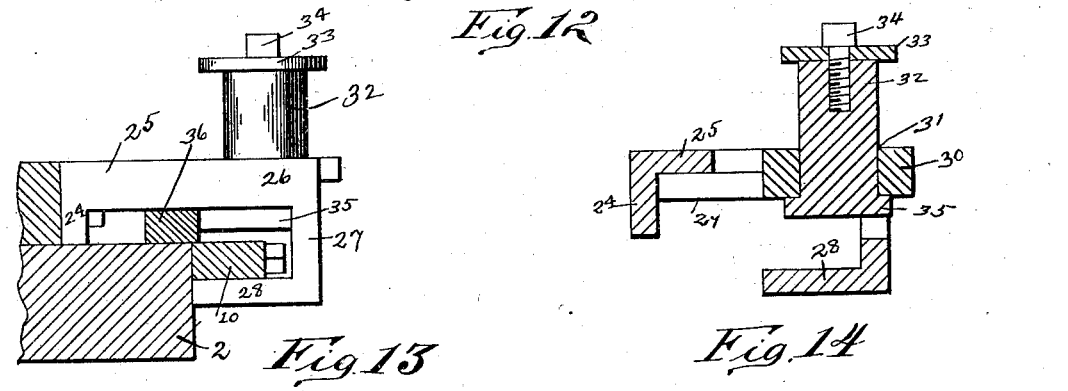

Figure 1 is a plan view of my improved mining machine. Fig. 2 is a side elevation thereof. Fig. 3 is a plan view of the framework. Fig. 4 is a side elevation of the same. Fig. 5 is a sectional view on line $x\ x$ of Fig. 1. Fig. 6 is a similar sectional view on line $y\ y$ of Fig. 1. Fig. 7 is a detail plan view of one of the forward corners of the sliding frame. Fig. 8 is a side elevation of the parts shown in Fig. 7. Fig. 9 is an enlarged transverse section on line $z\ z$ of Fig. 1. Fig. 10 is an enlarged central sectional view of the reversing clutch and adjacent parts. Fig. 11 is an enlarged plan view of a portion of one side of the machine frame showing the chain tension block and spring therein. Fig. 12 is a side elevation of the parts shown in Fig. 11. Fig. 13 is a sectional view on line $t\ t$ of Fig. 12. Fig. 14 is a sectional view on line $s\ s$ of Fig. 11 with the spring removed. Fig. 15 is a side elevation of a sprocket wheel showing a section of my improved chain thereon. Fig. 16 is a plan view of said sprocket wheel. Fig. 17 is a view partly in section and partly in elevation of two connected links of said chain. Fig. 18 is a view in elevation of two connected links of said chain. Fig. 19 is a view in elevation of one of the link pins. Fig. 20 is an end view of said pin. Fig. 21 is a sectional view on line $v\ v$ of Fig. 17, said view being taken with one of the links dropped to the position shown in dotted lines. Fig. 22 is a plan view of one of the links which I employ. Fig. 23 is a sectional view on line $r\ r$ of Fig. 18. Fig. 24 is a view in elevation of a modified form of link, and Fig. 25 is a perspective view of one of the cutting tools.

Similar numerals refer to similar parts throughout the several views.

2 represents the parallel side bars of the stationary frame of my machine. The forward ends of these bars are connected by a bridge piece 3 which rises from said bars while the rear portions of said stationary side bars are connected by a transverse bar 4, which has outwardly projecting and upwardly inclined end portions as shown. From the rear end portions of the side bars 2 of the stationary frame, rise bracket arms 5 which extend rearwardly and are provided at their rear ends with boxings 6. Within this boxing 6 bears a transverse crank shaft 7 having crank ends 8. The rear end of each of the brackets 5 is provided with an engine or cylinder seat 9 which is adapted to support the driving engine cylinder in the usual manner. As shown at 10, I provide the outer sides of the stationary frame side bars adjoining the upper sides thereof, with longitudinal cleats.

12 represents the parallel side bars of the sliding frame the latter being of less width than the stationary frame. The forward ends of these side bars are connected in the usual manner by transverse parallel guide or head plates 13, the latter being of such length as to project beyond the lines of the machine sides and having mounted between their ends, sprocket wheels 14, the latter being mounted upon vertical shafts 22. The rear ends of the side bars 12 are connected by a transverse plate 15. The sides of this plate 15 are provided with tongue projections 16 which rest and are adapted to slide within angular seats 17, formed in the upper and inner sides of the stationary frame bars 2. As indicated at 18 these tongues are secured by bolts to the side bars of the sliding frame which are above said tongues. Rigidly connected with and supported upon the plate 15 is a bearing frame 50 consisting of a horizontal top plate portion 51 supported upon vertical standards 52. The top plate 51 is provided throughout its length with a central concaved or rounded seat 53, which near its rear end is intersected by an opening 19 adapted as hereinafter described for the reception of a portion of a bevel gear wheel. The under side of the top plate 16 is provided centrally with a short downwardly projecting boss 20 in the under side of which is formed a shaft bearing socket 21. Bolted or otherwise secured to the outer sides of one of the sliding frame side-bars is the inner and downturned end 24 of an outwardly projecting bracket or guide frame 25. This guide frame has two outwardly projecting parallel arms 26, which have vertical downward extensions 27 at their outer ends which are connected by a transverse plate 28 the latter projecting inwardly in a plane parallel with the direction of the length of the arms 26. The inner sides of the arms 26 are provided as shown in the drawings at opposite points with longitudinal projecting ribs or tongues 29. 30 represents a sliding block which is adapted to fit and slide between the arms 26 of the bracket 25, said block having rabbeted sides for the reception of the tongues 29 of said bracket arms. The block 30 is provided with a central opening 31 through which projects upwardly and within which is driven a vertical pin 32, the latter having an enlarged head plate 33, which is detachably connected with the pin 32 by means of a screw 34. The lower end of the pin 32, is as shown at 35, enlarged to form a shoulder which bears against the under side of the block and against the under sides of the tongues 29.

36 represents a spring strip which is substantially of the double bow shape shown and the outwardly projecting portion of which passes beneath the arms 26 of the bracket and has its outer face or side bearing against the inner side of the enlarged lower end portion 35 of the pin 32. The outwardly and rearwardly extending curved arms 39 of the spring 36 are as shown in spring contact with the outer side of the sliding frame bar 12. From this construction it will be seen that the spring 36 will normally exert an outward spring pressure upon the sliding block 30. As shown in the drawings the lower inturned or hook shaped portion 28 of the bracket, bears against the side of the stationary bar 2 and engages the under side of the cleat 10 against which it is adapted when the sliding frame is moved, to slide as hereinafter described. Upon the upwardly projecting portion of the pin 32 is mounted a sprocket wheel 40.

41 represents a projecting bracket which as prescribed for the bracket 25, is secured to the sliding frame on the opposite side from the bracket 25. This bracket 41, is as prescribed for said bracket 25, provided with a hook shaped outer termination which engages the under side of the cleat 10. From the bracket 41 is supported a vertical pin 42 upon which is loosely mounted a sprocket wheel 43.

45 represents a nut holding block or channel bracket, said bracket being formed or connected with one side of the top portion 51 of the stand or frame 50. Within the under and open side of the block 45 is adapted to be inserted as shown two half nuts 55, which when fitted together are designed to fill the channel in said block or bracket. These half nuts are supported in the position described, by means of horizontal set screws 56 which passing through screw holes in the side walls of said bracket enter sockets or depressions 57 in said half nuts.

58 represents a longitudinal feed screw which passes as shown through the central opening of the nut formed by the connection of the half nuts 55. The forward end of this feed screw is journaled at 59 in a boxing in the forward stationary frame bridge or cross piece 3. The rear portion of the feed screw is as shown in the drawings, journaled in two supported standards or brackets 60—61 which rise from the base plate of a stand or bearing frame 62, which is supported upon the cross piece 4 of the stationary frame. Upon this stand 62 is journaled at 64 the rear end portion of the main shaft 65. This shaft 65 extending forwardly substantially mid-way between the side bars of the stationary frame has its forward end bearing in a suitable boxing upon the stationary frame bridge piece 3, as indicated at 66. An intermediate bearing is provided for said shaft as indicated at 67, said bearing being upon the upper side of the plate 51 of the stand or frame 50. As shown in the drawings, the depression 53 formed in the plate 51 serves to receive a portion of the shaft 65, while a bevel gear wheel 69 which is mounted upon said shaft 65 projects through the opening 19 of said plate. The shaft 65 carries on its rear end a bevel gear wheel 70, which gears with a bevel wheel 71 at right angles therewith and which is carried by the crank shaft 7. On opposite sides of the bearing 64, the shaft 65 carries a gear wheel 72 and a pinion 73. The pinion 73 meshes as shown, with an idle gear wheel 74 which is journaled on the front side of the stand 62.

75 and 76 represent respectively, gear wheels which are mounted upon the rear end portion of the feed screw 58 between the bearings 60 and 61. The teeth of the gear wheel 75 mesh as shown with the teeth of the gear wheel 72 of the main shaft, while the teeth of the gear wheel 76 mesh with the teeth of the idle wheel 74. Between the wheels 75 and 76 is keyed and adapted to slide upon the unthreaded portion of the screw 58, a clutch disk or ring 80, the latter having a peripheral groove or circumferential channel 81, into which fits a ring 82, the latter being connected in the usual manner with the forks 83 of a lever or handle 84. The clutch disk 80 is provided at intervals in its sides with sockets 85, which as shown in the drawings are adapted to receive studs 86 which project from the inner faces of the wheels 76 and 75.

89 represents a vertical pin, the upper end of which bears within the socket 21 of the hub 20 on the under side of the stand plate 50 and the lower end of which bears in the frame cross plate 15 at the center of the latter. Loosely surrounding the lower portion of this pin 89 above the cross bar 15, is a sprocket wheel 90 the upwardly extending hub of which has secured thereon, a horizontal bevel wheel 91, the latter loosely surrounding the upper portion of the pin 89. As shown in the drawings, the miter wheel 91 gears with the bevel pinion 19 of the main shaft 65.

Mounted upon the upper projecting end of one of the vertical sprocket wheel shafts 15 at the forward end of the machine is a cutter head 92, the latter being provided at intervals with outwardly projecting cutter tools 93. Extending rearwardly from the rear side of the cutter head 92 and having its forward end secured upon the top guide plate 13 is a following bar 94 the rear end of said bar being as shown, connected with one of the side bars of the sliding frame 12. Upon the vertical pins 95 which project from the upper side of the bar 94 are loosely mounted rollers 97, the latter being so arranged as to overhang the outer side of the bar 94 sufficiently to cause their projection to the outer line of projection of the tools 93 of the cutter head.

100 represents an endless tool carrying chain which as shown in the drawings, passes about and engages with the sprocket wheels 40, 90, 43 and 14, and 130 represents the cutting tools carried by said chain.

In the construction of the sprocket wheels herein mentioned, I provide the peripheries of said wheels with transverse concavities or pockets 101, the centers or bottoms of which communicate with transverse squared recesses 102. The sprocket teeth 103 which are formed between said concavities and recesses are divided into parallel rows by the formation of a central circumferential groove 104 in said sprocket wheel.

In the construction of the chain which passes about the sprocket wheels formed as above described, I provide an oblong tool link 105 which is provided at each end with a pair of rounded downwardly projecting transverse bearing heads or enlargements 106. Each of these bearing heads is provided with a central pin opening 107, the inner wall of said pin opening having formed therein, a key-way in the form of a longitudinal offset from said opening as indicated at 108. This key-way as shown in Fig. 23 of the drawings, is continued through one of the lugs or heads 106 and is provided with a short continuation 109 in the opposite lug, this continuation being in the form of a socket as shown. On the outer side of the link 105 is formed a suitable tool holding socket piece 110.

112 represents the connecting link, which as shown in the drawings, consists of a top plate 113, which is provided at each end with a downward and rearwardly extending disk shaped lug 114, the latter being of less thickness than said top plate or body as shown. These lugs 114 are each provided with a central pin opening 115, within which is formed a key-way 116 corresponding with the key-way 108 of the heads 106. The inner sides of these lugs 114 are connected as shown at 117 with a rib, which is of less thickness than said lugs.

118 represents a link joint pin which is adapted to fit and slide within the link openings 107 and 115 and which is provided at a point on one side of the center of its length with a projecting stud 119. Connecting the links of the chain the lugs 114 of the connecting links 112, are caused to fit between the heads or lugs 106 of the links 105. The key-ways 116 and 108 of the respective links are so arranged with reference to each other as to be brought into alignment and communication only when said connecting link is turned substantially to the position shown in Fig. 18 of the drawings, that is, at right angles with said tool link. The links being so turned, it will be seen that the pin 118 may be inserted through the openings 107 and 115 to connect said links, the stud of said pin traveling in the key-way 108 until it enters the internal socket 109. By then turning the links thus connected to the usual operating position, it will be seen that the key-ways 116 and 108 are brought out of alignment with each other and the possibility of the pin being withdrawn from the links is obviated.

As shown in Figs. 17 and 18 of the drawings, I may lock the link pin in position by the insertion of a key pin 121 through an opening formed in the periphery of one of the heads 106, allowing the inner end of said key pin to project within a suitable pin socket in the link pin. This insertion of the pin 121 is produced at such point in the head 106 as to cause the outer end of said pin to be covered by the lateral projecting portion of the body of the link 112 when said links are in operative position, thus preventing any tendency of the key pin working outward.

The method of setting my improved mining machine into operation is as follows: Rotary motion is imparted to the crank shaft 7 from suitable engines upon the supports 9. The rotation of this crank shaft and the gear connection of its wheel 71 with the miter wheel 70 must result as will readily be seen, in the rotation of the main shaft 65 upon which said wheel 70 is affixed. The rotation of the shaft 65 and its miter wheel 19 which is carried thereby, results through the connection of said miter wheel 19 and miter wheel 91 in the rotation of the latter and the sprocket wheel 90 which is connected therewith. This turning of the sprocket wheel 90 must result as will readily be seen, in a traveling movement of the cutting chain about the various sprocket wheels mentioned and in the tools which project from said chain in the usual manner being carried transversely across the front of the machine and made to engage with the wall of coal or other material which is adjacent thereto. In order to drive the sliding frame forward and feed the same against the coal wall, it is first necessary to so turn the lever 84 as to cause an engagement of the studs 86 of the gear wheel 76 with the sockets of the clutch disk 80. The connection thus formed between the clutch disk and the wheel 76 results in keying said wheel to the feed screw 12 and in the consequent rotation of the former through the gear connection of said wheel 76 and wheel 73. The engagement of the feed screw with the thread of the half nuts 55 results in feeding the sliding frame gradually forward as said feed screw is rotated. From the operation which I have described, it will be seen that both a feeding movement of the traveling frame forward upon the stationary frame and a traveling movement of the cutting chain are imparted. In order to reverse the motion of the feed screw and thereby cause the sliding frame to recede, the clutch disk is caused to engage with the studs of the wheel 75 which receives its motion through its connection with the wheel 72 of the main shaft 65. In case of a failure of the sliding frame to feed forward through clogging of the machinery or other cause, it will be seen that a break of the feed screw or other substantial parts of machine will be obviated, in as much as the pressure upon the half nuts 55 against the screw ends 57, will result in breaking off said screws, thereby severing connection of the half nuts with their holder, and allowing said half nuts to feed forward and drop from the holder. Owing to the fact that the spring 36 exerts a constant outward pressure upon the support of the sprocket wheel 40, it will be seen that any slack in the chain will be automatically taken up and that said chain will at all times be held taut in an operative position. The means which I have described and shown for transmitting movement to the chain are such as to bring the operating bevel wheel 91 and sprocket wheel 90 thereof at but a slight elevation above the main frame of the machine, thus admitting of the engines and driving mechanism being supported in low positions upon said machine. It will also be observed that the chain operating miter wheel and sprocket wheel are in the construction described made to rotate about a vertical pin or shaft instead of said shaft being rotated as is ordinarily done.

As my improved mining machine is fed forward against the wall of coal or other material to be mined, it will be seen that the tools of the rotating cutter head 92 will result in the formation of a kerf in the coal wall above the main kerf cut by the tools of the cutting chain and that the following bar 97 will travel against the side wall of said upper kerf. From this operation it will not only be seen that the bearing of said rollers against the coal surface will serve to prevent lateral movement of the machine in the direction of the cut, but said rollers will create less friction than the contact of the bar 94 with the coal.

It is obvious that a machine constructed in the manner herein shown and described must result in the production of an exceedingly strong, durable, effective and reliable form of mining machine and that the parts are so arranged and formed as to obviate any tendency of the same getting out of order and admit of the machine being used for mining exceedingly hard materials.

Having now fully described my invention, what I claim, and desire to secure by Letters Patent, is—

1. In a mining machine the combination with a stationary frame, a side cleat 10 thereon, a sliding frame mounted on said stationary frame, sprocket wheels mounted on said sliding frame and a chain cutter carried by said sprocket wheels, of a bracket 25 having parallel arms 26 which terminate in a hook shaped extension 28 as described, said extension engaging with the under side of said cleat 10, a sliding block 30 supported between said arms 26, a spring strip 36 bearing between said sliding block and the machine frame and a pin 32 supported from said sliding block upon which one of said sprocket wheels is loosely mounted substantially as and for the purpose specified.

2. In a mining machine the combination with a stationary and sliding frame, sprocket wheel carrying shafts 15 on the forward portion of said sliding frame, a cutter head on the end of one of said shafts, a following bar supported in rear of said cutter head and rollers journaled on said bar and projecting therefrom substantially as and for the purpose specified.

FRANCIS M. LECHNER.

In presence of—
C. C. SHEPHERD,
W. L. VAN SICKLE.